United States Patent
Christensen et al.

(10) Patent No.: US 9,938,372 B2
(45) Date of Patent: *Apr. 10, 2018

(54) FORMULATION METHODOLOGY FOR DISTORTIONAL THERMOSETS

(71) Applicant: THE BOEING COMPANY, Chicago, IL (US)

(72) Inventors: Stephen Christensen, Sammamish, WA (US); Samuel J. Tucker, St. Louis, MO (US); Jeffrey S. Wiggins, Petal, MS (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,844

(22) Filed: Dec. 27, 2016

(65) Prior Publication Data

US 2017/0101503 A1   Apr. 13, 2017

Related U.S. Application Data

(63) Continuation of application No. 15/013,542, filed on Feb. 2, 2016, now Pat. No. 9,556,306, which is a continuation of application No. 13/963,745, filed on Aug. 9, 2013, now Pat. No. 9,309,353.

(51) Int. Cl.
| | |
|---|---|
| *C08G 59/50* | (2006.01) |
| *C08K 7/02* | (2006.01) |
| *C08J 5/24* | (2006.01) |
| *C08G 59/24* | (2006.01) |
| *C08G 59/56* | (2006.01) |
| *C08G 59/66* | (2006.01) |
| *C08K 7/06* | (2006.01) |
| *C08K 7/14* | (2006.01) |
| *C08L 63/00* | (2006.01) |

(52) U.S. Cl.
CPC ....... *C08G 59/5033* (2013.01); *C08G 59/245* (2013.01); *C08G 59/50* (2013.01); *C08G 59/504* (2013.01); *C08G 59/5026* (2013.01); *C08G 59/56* (2013.01); *C08G 59/66* (2013.01); *C08J 5/24* (2013.01); *C08K 7/02* (2013.01); *C08K 7/06* (2013.01); *C08K 7/14* (2013.01); *C08L 63/00* (2013.01); *C08J 2363/00* (2013.01); *C08J 2377/06* (2013.01)

(58) Field of Classification Search
CPC . C08G 59/245; C08G 59/504; C08G 59/5033
USPC ........................................................ 525/510
See application file for complete search history.

(56) References Cited

U.S. PATENT DOCUMENTS

| | | | |
|---|---|---|---|
| 2,986,550 A | 5/1961 | Davis et al. | |
| 3,286,836 A | 11/1966 | Cesari | |
| 3,406,488 A | 10/1968 | Rykken | |
| 5,180,627 A * | 1/1993 | Inoue | B32B 7/12 428/214 |
| 5,266,405 A * | 11/1993 | Kirchmeyer | C08G 59/245 428/413 |
| 5,360,840 A * | 11/1994 | Chan | C08G 59/18 523/428 |
| 5,532,331 A | 7/1996 | Bales et al. | |
| 6,117,510 A * | 9/2000 | Ishikawa | C09J 7/0242 428/355 EP |
| 7,745,549 B2 | 6/2010 | Christensen et al. | |
| 7,985,808 B2 | 7/2011 | Christensen et al. | |
| 2007/0149725 A1 | 6/2007 | Christensen et al. | |
| 2010/0209136 A1 | 8/2010 | Mizushima et al. | |
| 2012/0128987 A1 | 5/2012 | Schoenfeld et al. | |

FOREIGN PATENT DOCUMENTS

| | | |
|---|---|---|
| GB | 789392 A | 1/1958 |
| WO | 03007078 A2 | 1/2003 |
| WO | 2012064662 A1 | 5/2012 |

OTHER PUBLICATIONS

Office Action for U.S. Appl. No. 13/963,745 dated Mar. 17, 2015.
Final Office Action for U.S. Appl. No. 13/963,745 dated Aug. 27, 2015.
Extended European Search Report dated Feb. 4, 2015, five pages.
G.M. Odegard and A. Bandyopadhyay, "Physical Aging of Epoxy Polymers and Their Composites", Journal of Polymer Science Part B: Polymer Physics 49(24) 1695-1716 (2011 ), pp. 1-46.
D.L. Buchanan et al., "Micromechanical enhancement of the macroscopic strain state for advanced composite materials", Composites Science and Technology 69 (2009) 1974-1978.
"Amine Curing of Epoxy Resins: Options and Key Formulation Considerations", Paint & Coatings Industry (PCI), Jun. 1, 2006, pp. 1-10.
T.D. Tran et al., "Micromechanical modelling for onset of distortional matrix damage of fiber reinforced composite materials", Composite Structures 94 (2012) 745-757.
M. Kodomari and S. Taguchi, "Friedei-Crafts Arylmethylation of Aromatics with Bis(chloromethyl)benzenes Catalysed by Zinc Chloride Supported on Silica Gel", J. Chem. Research (S), 1996,240-241.

(Continued)

*Primary Examiner* — Mike M Dollinger
(74) *Attorney, Agent, or Firm* — Patterson + Sheridan, LLP

(57) ABSTRACT

Methods and formulations for distortional thermosets are disclosed that display enhanced composite mechanical performances and robust sorption resistance. The composition includes an epoxy resin of formula (I):

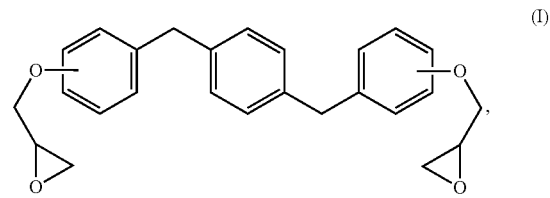

and a diamine curing agent. The resultant distortional thermoset compositions possess superior out-life requirements and advantageous reaction kinetics for preparing prepreg compositions and materials.

23 Claims, No Drawings

(56) References Cited

OTHER PUBLICATIONS

"Two Component Epoxy Amine Systems—Europe. Middle East and Africa", Cytec Industries Inc., 2009.

"Rheological Testing of Thermosetting Polymers", Understanding Rheology of Thermosets, revised by A.J. Franck, TA Instruments 2004.

S. Christensen et al., "Computational methods for new materials development", 53rd AIAA!ASME/ASCE/AHS/ASC Structures, Structural Dynamics and Materials Conference, 20th AI Apr. 23-26, 2012, Honolulu, Hawaii.

J.H Gosse and S. Christensen, "Strain Invariant Failure Criteria for Polymers in Composite Materials", A01-25005,; AIAA-2001-1184, 42nd AIAA!ASME/ASCE/AHS/ASC Structure, Structural Dynamics, and Materials Conference and D; Exhibit, Seattle, WA, Apr. 16-19, 2001.

T. Tran et al., "Application of a Scalar Strain-Based Damage Onset Theory to the Failure of a Complex Composite Specimen", 28th International Congress of the Aeronautical Sciences, Brisbane, Australia, Sep. 23-28, 2012.

E. Jaramillo et al., "Energy-based yield criterion for PMMA from large-scale molecular dynamics simulations", Physical Review B 85, 024114 (2012).

Office Action for U.S. Appl. No. 15/013,542 dated May 23, 2016.

\* cited by examiner

FORMULATION METHODOLOGY FOR DISTORTIONAL THERMOSETS

CROSS-REFERENCE TO RELATED APPLICATIONS

This application is a continuation of U.S. application Ser. No. 15/013,542 filed Feb. 2, 2016, which is a continuation of U.S. application Ser. No. 13/963,745 filed Aug. 9, 2013. The above-mentioned applications are hereby incorporated by reference.

FIELD

The disclosure relates generally to methods and formulations for distortional thermosets.

BACKGROUND

Thermoset polymers form the matrix in filled plastics and fiber-reinforced composites used in many different products. Thermosets are used extensively as adhesives, molding compounds and surface coatings. Three stages are typically used in the processing of thermoset polymers. In the A-stage the resin is still soluble and fusible. In the B-stage, thermosets are nearly insoluble but remain thermoplastic. Though the B-stage material exists in a molten state, this material is relatively short-lived owing to the fact that the temperature used to promote flow also causes the material to crosslink. The C-stage represents the final stage of polymerization, wherein the polymer undergoes crosslinking under the controlled influence of heat and pressure over time. The resultant thermosets build their final structure during this processing, forming a three-dimensional internal structural network of highly-crosslinked polymer chains. The final thermoset material is insoluble and not thermally reformable.

Many composite structures are composed of fibers and thermoset polymers that are generally epoxies. Because of the present restrictions on fiber orientations, the composites containing such thermosets typically deform matrix by dilatation when a mechanical load is applied. Since dilation is an elastic response to the applied load, these composites display low strength, high weight, and/or other limited mechanical performance attributes. Thus, composite materials that include fiber orientations coupled with thermosets have improved distortional properties when subjected to loads. U.S. Pat. No. 7,985,808 to Christensen et al. describes thermosets having a distortional matrix intended for use in composites with the proper fiber orientation, which is herein incorporated by reference in its entirety. A variety of engineering components and structures rely upon distortional thermosets afforded by certain epoxy resin composites.

All epoxies deform by either dilation and/or distortion. Dilation is controlled through non-bonded forces at the molecular level within the epoxy structure and is generally similar among various epoxies. Yet the distortional attributes of epoxies can be highly varied depending upon the chemical formulation of epoxies.

The matrix of epoxy composites will either dilate or distort depending on the nature of the loading and, most importantly, the fiber orientation. The fiber orientations of prepreg materials will force the matrix material to dilate. New design concepts for materials having optimal fiber orientation are exploring the benefits of distorting the matrix as a means for improved performance for these materials. Such design considerations require new epoxy matrix materials having optimized distortion attributes.

Yet distortional thermosets are affected by a variety of environmental elements that can compromise their reliability in epoxy-based engineering components and structures. Polymer or material changes caused by the service environment may lead to premature failure. Examples of such polymer changes and service life conditions include: thermo-oxidation; photo-oxidation (for example, from sunlight/UV-light); cyclic fatigue (for example, from vibration); physical aging (for example, densification); erosion; environmental stress-cracking resistance (ESCR); and sorption of water, fluids, etc. The effect of different service life conditions may be synergistic, leading to surprisingly quick failures. Polymer performance in these areas may be related to both the degree of crosslinking and the chemical nature or polarity of the amorphous polymer. For example, sorption of a fluid by the cured epoxy may lead to chemical changes as well as mechanical changes. For fully cured epoxies, fluid sorption has led to failures, often interrelated, from: swelling, modulus loss, strength loss, stress cracking (ESCR), weight gain, gloss loss, hardness loss, adhesion loss and coloration. Such service environment effects also affect distortional thermosets, where the desired mechanical performance attributes of these materials can be compromised.

BRIEF SUMMARY

In a first respect, a composition having a von Mises strain of at least 0.300 is disclosed, wherein the composition includes an epoxy resin of formula (I):

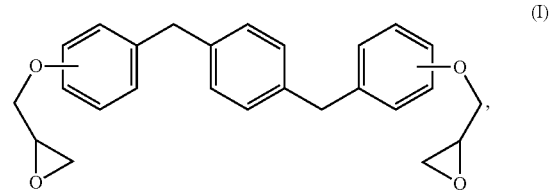

and a diamine curing agent.

In a second respect, composition having an absorption of fluid being no more than about 1% (wt) is disclosed, wherein the composition includes an epoxy resin of formula (I) and a diamine curing agent.

In a third respect, a prepreg composition is disclosed that includes a plurality of fibers, and a thermoset composition. The thermoset composition comprises an epoxy resin of formula (I) and a diamine curing agent.

In a fourth respect, a method of preparing a prepreg composition is disclosed. The method includes the step of applying a thermoset composition to a plurality of fibers. The thermoset composition comprising an epoxy resin of formula (I) and a diamine curing agent.

These and other features, objects and advantages will become better understood from the description that follows.

DETAILED DESCRIPTION

The composition and methods now will be described more fully hereinafter. These embodiments are provided in sufficient written detail to describe and enable a person having ordinary skill in the art to make and use the claims, along with disclosure of the best mode for practicing the claims, as defined by the claims and equivalents thereof.

Likewise, modifications and other embodiments of the methods described herein will come to mind to one of skill in the art having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art. Although any methods and materials similar to or equivalent to those described herein can be used in the practice or testing of the claims, the exemplary methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one."

The term "about" means within a statistically meaningful range of a value or values such as a stated concentration, length, molecular weight, pH, time frame, temperature, pressure or volume. Such a value or range can be within an order of magnitude, typically within 20%, more typically within 10%, and even more typically within 5% of a given value or range. The allowable variation encompassed by "about" will depend upon the particular system under study.

The chemical structures described herein are named according to IUPAC nomenclature rules and include art-accepted common names and abbreviations where appropriate. The IUPAC nomenclature can be derived with chemical structure drawing software programs, such as ChemDraw® (PerkinElmer, Inc.), ChemDoodle® (iChemLabs, LLC) and Marvin (ChemAxon Ltd.). The chemical structure controls in the disclosure to the extent that an IUPAC name is misnamed or otherwise conflicts with the chemical structure disclosed herein.

New distortional thermosets are disclosed that provide unexpectedly superior resistance to environmental contaminants and fluid sorption while preserving the enhanced mechanical performance attributes associated with previous distortional thermosets. The new formulations for the distortional thermosets also afford superior shelf-life storage capabilities at ambient temperatures. As detailed below, the new formulations have superior out-life requirements, wherein the formulations do not undergo premature hardening or curing at ambient temperature. Furthermore, the formulations provide advantageous reaction kinetics for preparing prepreg composites. These and other features of the new formulations and the methods directed thereto are more fully described below.

The new distortional thermosets are based upon an epoxy resin having the structure of formula (I):

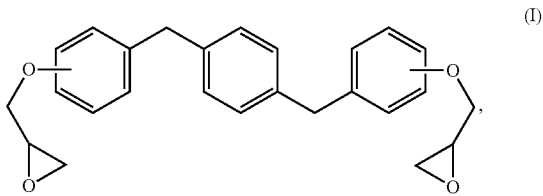

(I)

wherein the glycidyl ether moieties are independently selected to be coupled to their respective phenyl moieties at either the ortho-, meta- or para-positions relative to the coupled, phenylmethylenyl moiety. The IUPAC name for formula (I) corresponds to 2-{a-[(4-{[b-(oxiran-2-yloxy)phenyl]methyl}phenyl)methyl]phenoxy}oxirane, wherein a and b are independently designated 2, 3 or 4 depending upon the isomer. Compositions of compounds of formula (I) can include purified homogeneous preparations of any one of the six possible isomer forms, preparations of racemic mixtures including at least two or more of the isomer forms, and preparations of racemic mixtures including all six possible isomer forms.

Thus, isomers of formula (I), include formulas (Ia) through (If), as illustrated below in Table I:

TABLE I

Isomers of Formula (I).

| Formula | Structure | IUPAC Name |
|---|---|---|
| (Ia) | | 1,4-bis(2-(oxiran-2-yloxy)benzyl)benzene |
| (Ib) | | 2-(2-(4-(3-(oxiran-2-yloxy)benzyl)benzyl)phenoxy)oxirane |

TABLE I-continued

Isomers of Formula (I).

| Formula | Structure | IUPAC Name |
|---|---|---|
| (1c) | | 2-(2-(4-(4-(oxiran-2-yloxy)benzyl)benzyl)phenoxy)oxirane |
| (1d) | | 1,4-bis(3-(oxiran-2-yloxy)benzyl)benzene |
| (1e) | | 2-(3-(4-(4-(oxiran-2-yloxy)benzyl)benzyl)phenoxy)oxirane |
| (1f) | | 1,4-bis(4-(oxiran-2-yloxy)benzyl)benzene |

The synthesis of compounds of formula (I) are known in the art; see, for example, M. Kodomari and S. Taguchi, J. Chem. Research (S) pp. 240-241 (1996), the contents of which are herein incorporated by reference in its entirety. Because the synthesis of epoxy resins of formula (I) typically use the bisphenol of xylene as a starting material, a short-hand nomenclature for epoxy resins of formula (I) is BisX. As used herein, BisX represents any one of the isomers encompassed by formula (I), including formulas (Ia)-(If), as well as racemic mixtures of two or more such isomers encompassed by formula (I), including formulas (Ia)-(If).

The thermoset formulations disclosed herein include a multi-amine, such as a diamine, to promote curing or crosslinking of the epoxy resins of formula (I). The thermoset formulations can include a range of stoichiometric ratios of amine hydrogens to epoxide groups, varying from a balanced stoichiometry of about 1:1 to an amine starved stoichiometry of about 0.6:1.0. The thermoset formulations can include fractional values within the range of stoichiometric ratios of amine hydrogens to epoxide groups, such as about 0.95:1.0, about 0.90:1.0, about 0.85:1.0, about 0.75:1.0, about 0.70:1.0, and about 0.65:1.0. A variety of diamines are known in the art as curing agents. Examples of diamines as curing agents are provided in Table II. These monomeric precursors provide superior distortional matrices when used as curing agents with the epoxy resins of formula (I).

TABLE II

Exemplary Diamine Curing Agents.

| Formula | Structure | Name (Shorthand) |
|---|---|---|
| (II) | | 4,4'-sulfonyldianiline (44DDS) |
| (III) | | 4,4'-methylenedianiline (MDA) |

TABLE II-continued

Exemplary Diamine Curing Agents.

| Formula | Structure | Name (Shorthand) |
|---|---|---|
| (IV) | | 4,4'-oxydianiline (44ODA) |
| (V) | | 3,3'-(1,3-phenylenebis(oxy))-dianiline (APB133) |
| (VI) | | 4,4'-(1,3-phenylenebis(oxy))-dianiline (TPE-R) |
| (VII) | | 4,4'-methylenebis(2-ethyl-aniline) |
| (VIII) | | 3,3'-((2,2-dimethylpropane-1,3-diyl)bis(oxy))dianiline (DANPG) |
| (IX) | | 4,4'-(1,4-phenylenebis-(propane-2,2-diyl))dianiline |
| (X) | | 3-(4-(4-aminobenzyl)-benzyl)aniline |
| (XI) | | 4,4'-(1,4-phenylenebis(propane-2,2-diyl))bis(2,6-dimethylaniline) (EPON-1062-M) |
| (XII) | | 4,4'-(1,4-phenylenebis(oxy))-dianiline (TPE-Q) |
| (XIII) | | 3,3'-((propane-2,2-diylbis-(4,1phenylene))bis(oxy))-dianiline |

TABLE II-continued

Exemplary Diamine Curing Agents.

| Formula | Structure | Name (Shorthand) |
|---|---|---|
| (XIV) | | 3,3'-sulfonyldianiline (33DDS) |
| (XV) | | 4,4'-methylenebis(cyclohexan-1-amine) |
| (XVI) | | 4,4'-thiodianiline (ASD) |
| (XVII) | | 3,3'-((sulfonylbis(4,1-phenylene)bis(oxy))dianiline (m-BAPS) or (3BAPS) |
| (XVIII) | | 4,4'-(1,4-phenylenedisulfonyl)dianiline |
| (XIX) | | 4,4'-(pentane-1,5-diylbis-(oxy))dianiline (DA5MG) |
| (XX) | | 4,4'-([1,1'-biphenyl]-4,4'-diylbis(oxy))dianiline (BAPB) |
| (XXI) | | 4,4'-(1,3-phenylenebis-(propane-2,2-diyl))bis (2,6-diisopropylaniline) |

TABLE II-continued

Exemplary Diamine Curing Agents.

| Formula | Structure | Name (Shorthand) |
|---|---|---|
| (XXII) | [structure] | 4,4'-(1,3-phenylenebis-(propane-2,2-diyl))dianiline (Bisaniline M) |
| (XXIII) | [structure] | 4,4'-((sulfonylbis(4,1-phenylene))bis(oxy))dianiline (BAPS) |
| (XXIV) | [structure] | 4,4'-((propane-2,2-diylbis-(4,1phenylene))bis(oxy))-dianiline (BAPP) |
| (XXV) | [structure] | 4,4'-disulfanediyldianiline |

The diamine curing agents of Table II can be characterized in terms of certain properties, such as distortion behavior (for example, von Mises strain value), controllability of reaction kinetics of curing; fluid sorption resistance; resin modulus; glass transition temperature; melting point for blending; and health risks (for example, carcinogenic properties). Table III presents these attributes and their relative ranking for each of the diamine curing agents of Table II.

TABLE III

Criteria and Properties of Exemplary Diamine Curing Agents.

| Formula | Good for Distortion | Reaction Control for Curing | MEK Resistance (low free volume) | Adequate Resin Modulus | Adequate Glass Transition Temp. | Melting Point for Blending | Health Concerns |
|---|---|---|---|---|---|---|---|
| II | 2 | 5 | 4 | 4 | 5 | 4 | 5 |
| III | 2 | 3 | 4 | 4 | 4 | 4 | 1 |
| IV | 2 | 2 | 4 | 4 | 4 | 4 | 3 |
| V | 5 | 3 | 4 | 4 | 3 | 4 | 4 |
| VI | 5 | 2 | 4 | 4 | 3 | 4 | 4 |
| VII | 2 | 2 | 2 | 4 | 4 | 4 | 3 |
| VIII | 5 | 1 | 3 | 2 | 2 | 4 | 3 |
| IX | 5 | 2 | 2 | 3 | 3 | 3 | 3 |
| X | 5 | 2 | 4 | 3 | 3 | 3 | 3 |
| XI | 5 | 3 | 1 | 3 | 3 | 3 | 3 |
| XII | 5 | 2 | 4 | 3 | 3 | 3 | 3 |
| XIII | 4 | 3 | 3 | 2 | 2 | 2 | 3 |
| XIV | 2 | 2 | 4 | 4 | 4 | 4 | 4 |
| XV | 2 | 1 | 3 | 3 | 3 | 4 | 3 |
| XVI | 3 | 4 | 4 | 3 | 3 | 3 | 3 |
| XVII | 4 | 4 | 3 | 2 | 2 | 2 | 3 |
| XVIII | 5 | 4 | 4 | 4 | 4 | 1 | 3 |
| XIX | 4 | 2 | 2 | 2 | 2 | 4 | 3 |
| XX | 4 | 3 | 4 | 4 | 3 | 2 | 3 |
| XXI | 4 | 3 | 1 | 3 | 3 | 2 | 3 |
| XXII | 4 | 3 | 2 | 3 | 3 | 3 | 3 |
| XXIII | 4 | 4 | 3 | 2 | 2 | 2 | 3 |
| XXIV | 4 | 5 | 3 | 2 | 2 | 2 | 3 |
| XXV | 3 | 5 | 4 | 3 | 3 | 3 | 3 |

With respect to each of the performance attributes identified in Table III, each of the diamine curing agents has a relative ranking on a scale from 1 to 5, where a ranking score of "1" (where applicable) refers to a particular performance attribute that is least preferred with respect to that single attribute when compared to other diamine curing agents and where a ranking score of "5" refers to a particular performance attribute that is most preferred with respect to that single attribute when compared to other diamine curing agents. One skilled in the art will recognize that the selection of a given diamine curing agent in a thermoset formulation will depend upon the relative importance of each performance attribute of the diamine curing agent in relation to the particular application for which the thermoset formulation will be used. Among distortional thermoset formulations that include epoxy resin having formula (I), the selection of the diamine curing agent is based upon distortion behavior performance attributes as the highest ranking criterion, followed by the following secondary performance attributes in rank descending order: curing reaction control, fluid sorption resistance (e.g., MEK sorption resistance), resin modulus, and Tg (glass transition temperature). Each of these performance attributes are described in greater detail below.

Distortional Performance—Von Mises Strain

The determination of distortion behavior performance and what constitutes "good for distortion" index scores of the diamine curing agents presented in Table III can be determined by molecular dynamics simulation and by experimental test. Distortion as determined by molecular dynamics simulation can be quantified by a measurement of the equivalent strain at yield or the point of peak stress on the stress-strain curve. For this analysis, one performs a unidirectional compression loading tracking the equivalent strain versus the equivalent stress and selects the value of equivalent strain that corresponds to the zero slope in the stress versus strain plot. One can interpret this value to be equal to the yield condition for the polymer.

Distortion as determined by experimental test can be done with a 10 degree lamina coupon and use the finite element method with micromechanical enhancement to determine the values of the trace of the strain tensor at the critical point (highest value). The von Mises equation is then used with the obtained data to calculate the critical value.

These methods are well known in the art, as reflected by works by Tran T. D., Kelly D., Prusty B. G., Gosse J. H., Christensen S., "Micromechanical modeling for onset of distortional matrix damage of fiber reinforced composite materials," Compos. Struct. 2012; 94:745-757 and Buchanan D. L., Gosse J. H., Wollschlager J. A. Ritchey A., Pipes R. B. "Micromechanical enhancement of the macroscopic strain state for advanced composite materials," Compos. Sci. Technol. 2009; 69:1974-1978, the contents of both which a incorporated by reference for their respective teachings.

Accordingly, molecular dynamics simulations were performed in which the epoxy and diamine curing agent were varied in a systematic fashion to elucidate the effect of the particular formulation change on the distortional deformation capacity. Selected systems were also tested by experiment to verify the accuracy of the molecular dynamic simulations. A summary of von Mises strain values determined for these systems is presented in Table IV, which demonstrates that the simulations provide good agreement with tests for determining von Mises strain values.

TABLE IV von Mises strain values for thermoset formulations with different diamine curing agents[1]

| Epoxy Resin | (XVII) (m-BAPS) | (V) (ABP133) | (XIV) (33DDS) |
|---|---|---|---|
| D.E.N. 431 | [0.468]; 0.342 0.345 | [0.503]; 0.37 | [0.413]; 0.345 0.315 |
| Tactix 123 | [0.32]; 0.31 | [0.32]; 0.29 | [0.27]; 0.345 0.332 |
| Tactix 556 | [0.38] | [0.36]; 0.25 0.24 | [0.17] |
| PY 306 | [0.31] | [0.27] | [0.25]; 0.22 0.27 |

[1]For thermosets containing a given epoxy resin with each diamine curing agent, the first line of data represents von Mises values based upon molecular dynamics simulations (bracketed values reflect one configuration; bolded values reflect the average of five configurations) and the second line of data (where applicable) reflect von Mises values based upon experimental test.

Table V summaries the actual von Mises values corresponding to the relative rankings of distortional performance attributes for the diamine curing agents of Table III.

TABLE V von Mises strain values correspondences for relative rankings of Table IV.

| Ranking Value | von Mises Strain Values[1] |
|---|---|
| 1 | — |
| 2 | 0.18-0.23 |
| 3 | 0.24-0.30 |
| 4 | 0.31-0.35 |
| 5 | >0.35 |

[1]von Mises strain values are reported as a range of values.

Exemplary diamine curing agents having high distortional properties include those having a plurality of coupled aromatic ring groups (for example, three aromatic ring groups), such as formulas (V), (VI), (VIII)-(XIII), and (XVII)-(XXIV).

Curing Reaction Control Performance

The reactivity of the amine curing agent, both in terms of reaction kinetics and temperature-dependence of reactivity, correlates approximately with the nucleophilicity of the amino groups of the diamines. To assess reaction control for curing by a given diamine curing agent, one can perform quantum simulations to determine the electron distribution and to calculate a reactivity index known as the Fukui index. The technique measures the atom affinity to be the site of either an electrophilic or nucleophilic attack. The amine is a nucleophile and would be susceptible to an electrophilic attack, so the Fukui (F) index was determined and compared with $pK_b$ measurements to first calibrate the simulation technique and then used in the method with amines for which no basicity values could be found to rank reactivity in an $S_N2$ reaction that would lead to the polymerization. Amine basicity and reactivity are directly proportional so the Fukui index can be used to measure the inductive and resonance effects of the aromatic ring and any electron donating or withdrawing substituents favorably or unfavorably placed as a comparative indicator of reaction potential. Reactivity data, Fukui index data and $pK_b$ values are presented for different diamine curing agents in comparison to the reactivity of diamine curing agent having the formula (II) (44DDS) are presented in Table VI.

TABLE VI

Fukui electrophilic indices, predicted pKb values and relative reactivity of exemplary diamine curing agents

| Formula | Fukui Electrophilic Index[1] | Predicted $pK_b$[1] | Relative Reactivity[1,2] |
|---|---|---|---|
| (II) | 0.046 | 13 | 1.000 |
| (44DDS) | 0.082 | 13 | 1.000 |
| (III) | 0.076 | 11.83174 | 14.732 |
| (MDA) | 0.085 | 12.89277 | 1.280 |
| (V) | 0.063 | 12.33798 | 4.592 |
| (APB133) | 0.071 | 13.39319 | 0.404 |
| (VIII) | 0.091 | 11.24761 | 56.545 |
| (DANPG) | 0.104 | 12.21363 | 6.115 |
| (XIV) | 0.0815 | 11.61756 | 24.124 |
| (33DDS) | 0.0850 | 12.89277 | 1.280 |
| (XVII) | 0.0655 | 12.24063 | 5.746 |
| (3BAPS) | 0.0725 | 13.33957 | 0.458 |
| (XXIII) | 0.0655 | 12.24063 | 5.746 |
| (BAPS) | 0.0720 | 13.35744 | 0.439 |
| (XXIV) | 0.0535 | 12.70793 | 1.959 |
| (BAPP) | 0.0595 | 13.80424 | 0.157 |

[1]First line entries reflect Mulliken-based correlations and second line entries reflect Hirshfeld-based correlations.
[2]Reactivity relative to diamine curing agent of formula (II).

Table VII summarizes the curing reaction control values corresponding to the relative rankings of reaction control for curing performance attributes for the diamine curing agents of Table III.

TABLE VII

Reaction control correspondences for relative rankings of Table VI

| Ranking Value | Curing Reaction Control Values, k[1] |
|---|---|
| 1 | k > 55 |
| 2 | 24 < k ≤ 55 |
| 3 | 8 < k ≤ 24 |
| 4 | 2 < k ≤ 8 |
| 5 | 1 ≤ k ≤ 2 |

[1]Curing reaction control is expressed as relative reactivity in comparison to diamine curing agent of formula (II) (44DDS) using the Mulliken-based correlations for the indicated ranges.

The ranking values summarized in Table VII provide a useful guide to refine selection of appropriate diamine curing agents for distortional thermoset formulations including epoxy resins of formula (I). Additional considerations based on chemical knowledge and experience from empirical studies can lead to further refinement in the selection of diamine curing agent. For example, certain diamine curing agents presented in Table III have a reduced relative score than suggested from the data presented in Table VI, owing to the fact that they display greater reactivity towards epoxy resins (see, for example, formula (V)).

Exemplary diamine curing agents include those that possess chemical latency properties, such as remaining stable at ambient temperature and only promote curing at an elevated temperature. Such diamine curing agents typically include reactive amino groups having reduced nucleophilicity relative to alkyl amines; such diamines can include reactive amino groups conjugated to electron-withdrawing moieties, such as conjugated aromatic systems, such as aryl moieties, wherein the aromatic systems contain $-SO_2$, $-SO_3H$, $-NO_2$, $-CN$, $-CR_3$, wherein R is, for example, a halide, $-CHO$, $-CO_2H$, at the ortho- and para-positions relative to the reactive amino group.

Exemplary diamine curing agents having slower kinetics of curing include formulas (II), (XVI)-(XVIII) and (XXIII)-(XXV) of Table III. Exemplary diamine curing agents having fast kinetics of curing include formulas (III)-(XV) and (XIX)-(XXII) of Tables III.

Fluid Sorption Resistance Performance

An empirical test of fluid sorption resistance is the ability for a given thermoset composite to absorb Methyl ethyl ketone (MEK). In this test, a composite containing a thermoset formulation is permitted to soak in MEK for a period of time, such as from about 3 days to about 30 days. Following a soak period, the weight of the composite is obtained and compared with the weight of the composite prior to beginning the soak. The percentage increase in weight of the composite following the soak period reflects the amount of fluid sorption picked up by the composite over time. Thermoset formulations that absorb greater than about 10% (wt) fluid will have short lifespan under normal use conditions. Exemplary diamine curing agents having high fluid sorption resistance properties include formulas (II)-(VI), (X), (XII), (XIV), (XVI), (XVIII), (XX) and (XXV).

Table VIII summarizes 30 day MEK weight pick-up for neat resin samples, a process that mimics the composite soaking procedure described above. Relating the neat resin MEK soak data to molecular structure gives insight to the molecular moieties that affect fluid sorption performance. It is observed that the fluid sorption resistance of the polymer is decreased by the existence of pendant groups and linkages between phenylene rings that undergo facile motion. Alternatively, the fluid sorption resistance of the polymer is increased by the presence of rigid pendant groups and phenylene ring linkages, which do not undergo facile motion.

TABLE VIII

MEK Diffusivity Data

| Material | 30 day weight pick up, % | Density, gm/cc (simulated) |
|---|---|---|
| BisA/APB133 | 1.0 | 1.182 |
| BisA/BisM aniline | 3.5 | |
| BisA/BisP aniline | 4.5 | |
| BisM/BisM aniline | 10 + (3 days) | |
| BisM/APB133 | 15.5 (8 days) | 1.144 |
| BisM/BisP aniline | 11 + (15 days) | |
| BisF/MDA | 0.33 | 1.189 |
| BisF/BisM aniline | 1.42 | |
| BisF/APB133 | 0.4 | 1.211 |
| BisF/BisP aniline | 1.5 | |
| BisA/BAPS | ~1.0 | 1.210* |
| BisA/mBAPP | 2.4 | 1.155 |
| BisM/mBAPP | 13.5 (11 days) | |
| BisF/mBAPP | 1.0 | |
| BisF/BAPS | 0.5 | 1.239* |
| BisA/44DDS | 8 | 1.208* |
| BisS/44DDS | 0.2 | |
| BisF/44DDS | 2.0 | 1.238* |
| BisM/44DDS | | 1.163* |
| BisF/33DDS | 0.5 | 1.240* |
| BisA/33DDS | 2.5 | 1.187* |

Resin Modulus and Glass Transition Temperature Performance

The resin modulus performance attributes of the diamine curing agents relate to the number of ring systems in their structure, wherein more rings within a given structure tends to reduce the resin modulus. Measurements of the four-ring systems show that Young's modulus decreased to about 300,000 psi whereas measurements with a two-ring system (e.g., formula (II), 44DDS), the Young's modulus is usually >500,000 psi. Similar reasoning pertains to the glass transition temperature value, $T_g$, wherein a tighter network afforded by the smaller molecules usually increases intermolecular attractions and results in a higher $T_g$. Since both modulus and $T_g$ are influenced by both the diamine curing agent and the epoxy resin, one can only provide trends regarding the diamine curing agent influence on performance. The relative (1 to 5) ranking of both acceptable resin modulus and Tg values is reflected in the number of ring groups, wherein the higher ranking values are found for diamine curing agents having more ring groups within their structure. Exemplary diamine curing agents having adequate modulus and glass transition temperatures include formulas (II)-(VII), (XIV), (XVIII) and (XX).

Blending Melting Point Performance

Thermoset formulations can blended by dissolving solid crystalline amine in semi-liquid epoxy. The blending process can require heating the epoxy resin to a moderate temperature (e.g. about 140° F.) and adding the diamine curing agent as a finely ground powder until the mixture is clear. The mixture is then cooled to room temperature and evaluated to ascertain whether the diamine curing agent remains in solution, as evidenced by the solution remaining clear and not becoming cloudy. One consideration for dissolution is the melting point temperature of the diamine curing agent. Thus, the relative (1 to 5) ranking of diamine curing agents is reflected in melting point temperature, wherein the higher ranking values are found for diamine curing agents having lower melting point temperatures. For example, formula (XVIII) has a ranking value of "1" in blending melting point performance owing to the fact that this diamine curing agent has a melting point temperature of ~300° C. Exemplary diamine curing agents having a useful melting point for blending include formulas (II)-(VIII), (XIV), (XV) and (XIX).

In terms of distortional thermoset formulations that include the epoxy resin of formula (I), consideration of diamine curing agents exhibiting good for distortion behavior is important, followed by consideration of controllability of curing reaction kinetics (that is, reaction control for curing as depicted in Table III), fluid sorption resistance, acceptable modulus and glass transition temperature values. In some embodiments of thermoset formulations, the epoxy resin of formula (I) is cured with at least one diamine curing agent having good for distortion behavior, such as a diamine curing agent selected from the group consisting of formulas (V), (VI), (VIII)-(XIII), and (XVII)-(XXIV), and combinations thereof.

In some embodiments, distortional thermoset formulations can include the epoxy resin of formula (I) and a diamine curing agent of any of formulas (II)-(XXV). In some embodiments, distortional thermoset formulations can include epoxy resin of formula (I) and the diamine curing agent of formula (V).

In other embodiments, distortional thermoset formulations can include the epoxy resin of formula (I) and a mixture of two or more diamine curing agents of any of formulas (II)-(XXV). Distortional thermoset formulations can include epoxy resin of formula (I) and a mixture of two diamine curing agents, wherein a first diamine curing agent exhibits slow curing reaction kinetics and a second diamine curing agent exhibits fast curing reaction kinetics. In some embodiments of distortional thermoset formulations, the mixture of two diamine curing agents includes a first diamine curing agent selected from the group consisting of formulas (II), (XVI)-(XVIII) and (XXIII)-(XXV), and combinations thereof and a second diamine curing agent selected from the group consisting of formulas (III)-(XV) and (XIX)-(XXII), and combinations thereof.

The relative amounts of the first diamine curing agent and the second diamine curing agent are selected to afford reliable control of the kinetics of curing the thermoset formulations including an epoxy resin formula (I). In some embodiments, the mixture of diamine curing agents can be adjusted to include about 90% (wt) of the first diamine curing agent and about 10% (wt) of the second diamine curing agent.

In one embodiment of a thermoset formulation that includes the epoxy resin of formula (I) and a mixture of two diamine curing agents, the first diamine curing agent is formula (II) and the second diamine agent is formula (V). With respect to the mixture of diamine curing agents of formulas (II) and (V), the mixture can be adjusted to include about 90% (wt) of the diamine curing agent of formula (II) and about 10% (wt) of the diamine curing agent of formula (V).

Where distortional thermoset formulations include a mixture of two or more diamine curing agents, it is desirable to adjust the proportions of the mixture so that optimal out-life requirements and advantageous curing reaction kinetics can be achieved. Thus, a highly reactive diamine curing agent can be included in mixtures of diamine curing agents, provided that it represents a sufficiently minor component so as to provide the desired product specifications in distortional thermoset formulations in terms of the desired out-life requirements and advantageous reaction kinetics. One skilled in the art can readily determine optimal recipes for mixtures of two or more diamine curing agents for use in distortional thermoset formulations disclosed herein. Such distortional thermoset formulations provide desirable out-life requirements, advantageous reaction kinetics for curing mixtures and superior mechanical properties.

Prepreg Materials and Compositions

The distortional thermoset formulations can be used to prepare prepreg materials and compositions. Materials for prepregs include fibers composed of graphite, fiberglass, nylon, Kevlar® and related materials (for example, other aramid polymers), Spectra® (a polyethylene fiber), among others. The distortional thermoset formulations are typically prepared by solubilizing the diamine curing agent(s) into the epoxy resin of formula (I) by mixing and thereafter applying the resultant formulation(s) onto a plurality of fibers or laminates thereof. The term, "applying" includes any deposition method (for example, dipping, coating, spraying, etc.). The distortional thermosets used for generating these fiber composites can occur typically with a multistep process as desired according to meeting certain engineering logistics and structure build-outs. The distortional thermosets disclosed herein possess favorable reaction kinetics for preparing cured fiber-based prepreg compositions, as defined by at least one of the following features:

(1) distortional thermoset formulations maintain melt phase at viscosities conducive to prepreging (that is, forming a prepreg composition) for 4 or more hours;

(2) once the prepreg composition is formed, the viscosity of the distortional thermoset formulation will not advance (that is, remain stage B transitional material) when frozen;

(3) a thawed prepreg composition remains workable for at least 45 days at ambient temperature and pressure to accommodate the layup of large engineering structures (for example, aerospace structures); and (4) the prepreg composition will cure to desired properties in current autoclave processing conditions (for example, 350° F. for 3-6 hours).

Comparison to Other Distortional Thermosets Reveals Surprising, Unexpected Properties in Sorption Resistance of Thermosets That Include Epoxy Resins of Formula (I)

The distortional thermoset formulations disclosed herein retain the enhanced composite mechanical performances of other distortional thermosets, including increased distortional deformation and/or decreased dilation load, as reflected by substantially improved von Mises strains of about 0.300 or greater as compared to conventional non-distortional thermosets (von Mises strains in the range from about 0.15 to about 0.19). However, the distortional thermoset formulations disclosed herein display superior sorption resistance characteristics when compared to previously described thermosets. For example, the distortional thermoset formulations comprising the epoxy resin of formula (I) absorb about 1% (wt) or less of contaminating materials and fluids, such as Methyl ethyl ketone (MEK). By contrast, other distortional thermosets absorb up to 100-fold more of contaminating materials and fluids under comparable conditions.

A dramatic illustration of the surprisingly unexpected sorption properties of thermosets having the epoxy resin of formula (I) is the superior resistance to fluid sorption that the thermoset displays when compared to a thermoset composition that includes a structurally similar epoxy resin, 1,3-bis(2-(4-(oxiran-2-ylmethoxy)phenyl)propan-2-yl)benzene (BisM) (see Table IX). The differences in the MEK fluid sorption resistance properties are not obvious from inspection of the chemical structures of BisX and BisM alone.

Thus, prepreg compositions that include the distortional thermoset compositions disclosed herein afford comparable composite mechanical performances of other distortional thermosets, yet provide surprisingly robust fluid sorption resistance attributes not found in prior art distortional thermosets. Such qualities may provide improved performance, reduced weight, and reduced failure onsets over the lifetime of the prepreg composites that include the distortional thermosets disclosed herein. Furthermore, the formulations for the distortional thermosets disclosed herein have improved out-life requirements and advantageous reaction kinetics, rendering the formulations more reliable for preparing prepreg composite materials and structures.

To the extent that the present application references a number of documents, those documents are hereby incorporated by reference herein in their entirety.

While the present disclosure has been described with reference to certain embodiments, it will be understood by those skilled in the art that various changes may be made and equivalents may be substituted without departing from the scope of the present disclosure. In addition, modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A composition, comprising one or more reaction products of an amount of:

an epoxy resin of formula (I):

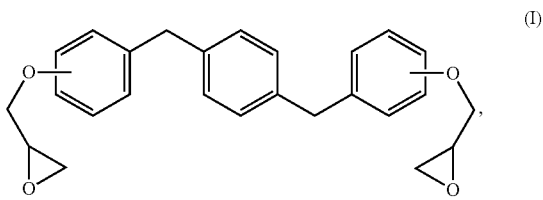

and

TABLE IX von Mises strains and MEK sorption resistance in different thermosets.

| Name | Structure of Epoxy Resin of Thermoset[1] | Von Mises strain data | MEK sorption |
|---|---|---|---|
| BisX (formula (I)) | | >0.300 | ≤1% (wt) |
| BisM[2] | | >0.300 | ≥15% (wt) |

[1]Both thermoset formulations include diamine curing agent of formula (II) (44DDS) in a 1:1 stoichiometric ratio with the respective epoxy resins.
[2]See U.S. Pat. Nos. 7,745,549 and 7,985,808.

a first diamine curing agent comprising at least one electron-withdrawing moiety selected from —SO$_2$, —SO$_3$H, —NO$_2$, —CN, —CR$_3$, —CHO, and —CO$_2$H, wherein R is a halide, wherein the composition has:

an absorption of methyl ethyl ketone fluid being no more than about 1% by weight after 30 days, and a von Mises strain of at least 0.300, as determined using a 10 degree lamina coupon.

2. The composition of claim 1, wherein the epoxy resin of formula (I) is

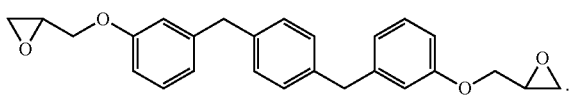 [SMILES: c1cc(Cc2ccc(Cc3cccc(OCC4CO4)c3)cc2)cc(OCC2CO2)c1]

3. The composition of claim 1, wherein the epoxy resin of formula (I) is

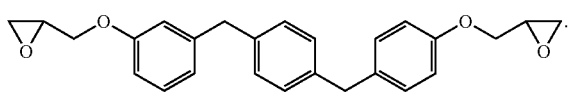 [SMILES: c1cc(Cc2ccc(Cc3ccc(OCC4CO4)cc3)cc2)cc(OCC2CO2)c1]

4. The composition of claim 1, wherein the epoxy resin of formula (I) is

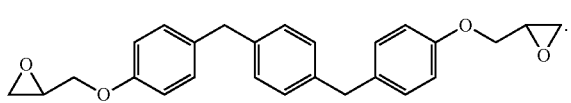 [SMILES: c1cc(Cc2ccc(OCC3CO3)cc2)ccc1Cc1ccc(OCC2CO2)cc1]

5. The composition of claim 1, wherein the epoxy resin of formula (I) is

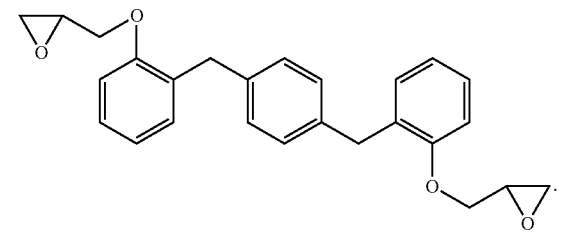 [SMILES: c1ccc(OCC2CO2)c(Cc2ccc(Cc3ccccc3OCC3CO3)cc2)c1]

6. The composition of claim 1, wherein the epoxy resin of formula (I) is

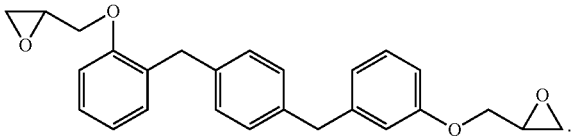 [SMILES: c1cc(Cc2ccc(Cc3ccccc3OCC3CO3)cc2)cc(OCC2CO2)c1]

7. The composition of claim 1, wherein the epoxy resin of formula (I) is

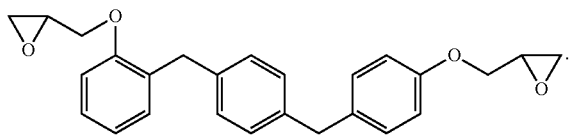 [SMILES: c1ccc(OCC2CO2)c(Cc2ccc(Cc3ccc(OCC4CO4)cc3)cc2)c1]

8. The composition of claim 1, wherein the epoxy resin of formula (I) is in stoichiometric excess relative to the diamine curing agent.

9. The composition of claim 1, wherein the diamine curing agent has a Fukui electrophilic index between about 0.04 and about 0.06 by Mulliken-based correlations.

10. The composition of claim 1, further comprising a second diamine curing agent.

11. The composition of claim 10, wherein the second diamine curing agent is selected from the group consisting of formulas (II)-(XXV):

(II)
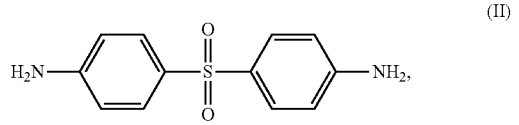

(III)
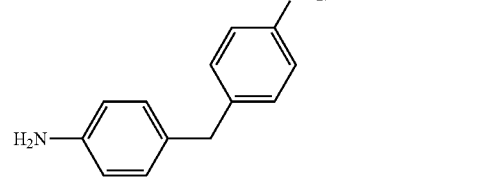

(IV)
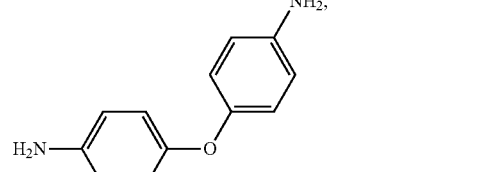

(V)
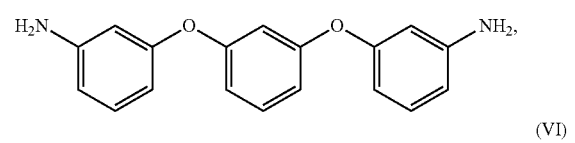

(VI)
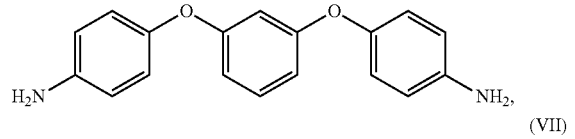

(VII)
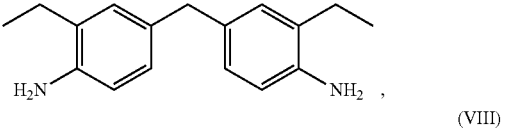

(VIII)
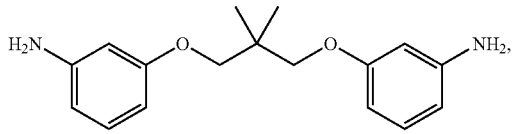

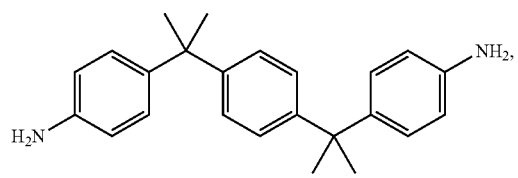
(IX)
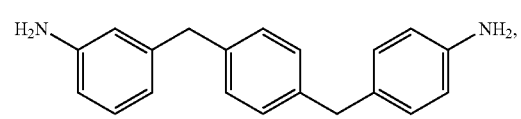
(X)
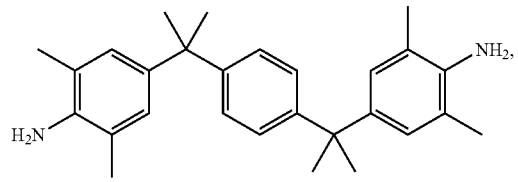
(XI)
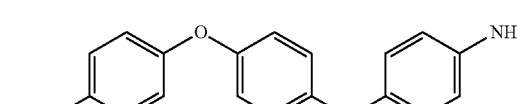
(XII)
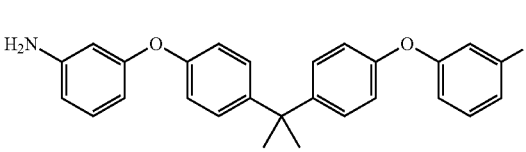
(XIII)
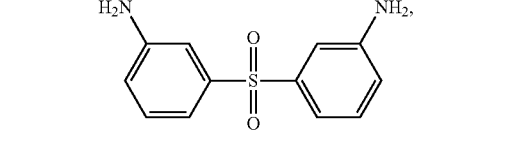
(XIV)
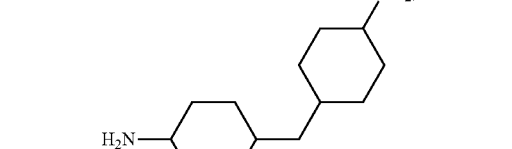
(XV)
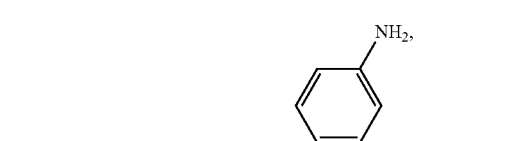
(XVI)
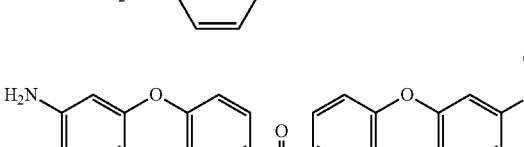
(XVII)
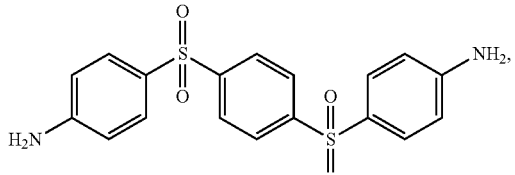
(XVIII)
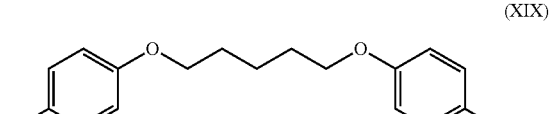
(XIX)
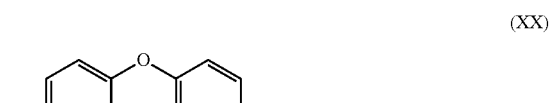
(XX)
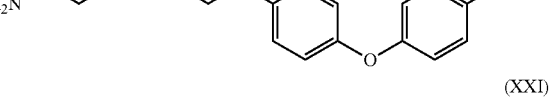
(XXI)
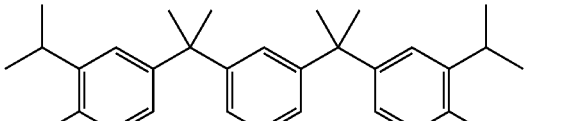
(XXII)
(XXIII)
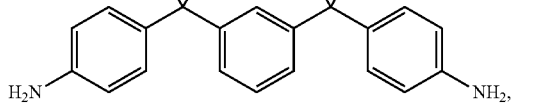
(XXIV)
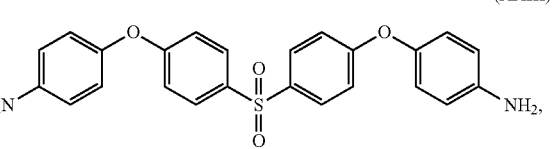
(XXV)
and combinations thereof.
12. The composition of claim 10, wherein the second diamine curing agent is 4,4'-sulfonyldianiline.
13. The composition of claim 10, wherein the second diamine curing agent has a curing reaction control value between about 1 and about 55 as relative reactivity compared to 4,4'-sulfonyldianiline by Mulliken-based correlations.

14. The composition of claim 10, wherein the second diamine curing agent has a curing reaction control value between about 1 and about 24 as relative reactivity compared to 4,4'-sulfonyldianiline by Mulliken-based correlations.

15. The composition of claim 14, wherein the second diamine curing agent has a curing reaction control value between about 1 and about 8 as relative reactivity compared to 4,4'-sulfonyldianiline by Mulliken-based correlations.

16. The composition of claim 15, wherein the first diamine curing agent has a curing reaction control value between about 24 and about 55 as relative reactivity compared to 4,4'-sulfonyldianiline by Mulliken-based correlations.

17. The composition of claim 10, wherein the second diamine curing agent comprises at least one electron-withdrawing moiety.

18. The composition of claim 17, wherein the at least one electron-withdrawing moiety of the second diamine curing agent is selected from the group consisting of: —$SO_2$, —$SO_3H$, —$NO_2$, —CN, —$CR_3$, —CHO, and —$CO_2H$, wherein R is a halide.

19. The composition of claim 1, wherein the first diamine curing agent has three ring groups.

20. The composition of claim 10, wherein the second diamine curing agent is selected from the group consisting of 4,4'-methylenedianiline, 4,4'-oxydianiline, 3,3'-(1,3-phenylenebis(oxy))-dianiline, 4,4'-(1,3-phenylenebis(oxy))-dianiline, 4,4'-methylenebis(2-ethyl-aniline), 3,3'-((2,2-dimethylpropane-1,3-diyl)bis(oxy))dianiline, 4,4'-(1,4-phenylenebis-(propane-2,2-diyl))dianiline, 3-(4-(4-aminobenzyl)-benzyl)aniline, 4,4'-(1,4-phenylenebis(propane-2,2-diyl))bis(2,6-dimethylaniline), 4,4'-(1,4-phenylenebis(oxy))-dianiline, 3,3'-((propane-2,2-diylbis-(4,1-phenylene))bis(oxy))-dianiline, 3,3'-sulfonyldianiline, 4,4'-methylenebis(cyclo-hexan-1-amine), 4,4'-(pentane-1,5-diylbis-(oxy))dianiline, 4,4'-([1,1'-biphenyl]-4,4'-diylbis(oxy))dianiline, 4,4'-(1,3-phenylenebis-(propane-2,2-diyl))bis(2,6-diisopropylaniline), and 4,4'-(1,3-phenylenebis-(propane-2,2-diyl))dianiline.

21. The composition of claim 1, further comprising one or more fibers.

22. The composition of claim 21, wherein the one or more fibers is selected from the group consisting of graphite, fiberglass, nylon, aramids, aramid polymers, and polyethylene.

23. The composition of claim 1, wherein the at least one electron-withdrawing moiety is selected from —$SO_3H$, —$NO_2$, —$CR_3$, —CHO, and —$CO_2H$, wherein R is a halide.

* * * * *

UNITED STATES PATENT AND TRADEMARK OFFICE
CERTIFICATE OF CORRECTION

PATENT NO. : 9,938,372 B2  
APPLICATION NO. : 15/390844  
DATED : April 10, 2018  
INVENTOR(S) : Stephen Christensen et al.

Page 1 of 1

It is certified that error appears in the above-identified patent and that said Letters Patent is hereby corrected as shown below:

In the Claims

In Column 24, Lines 25-33, in Claim 11, delete " 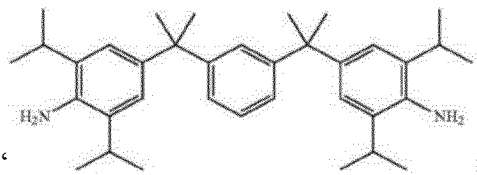 ," and insert -- 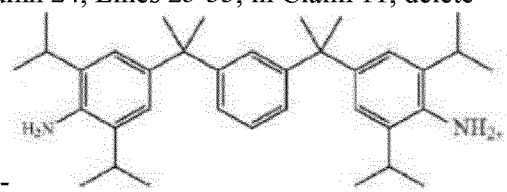 --, therefor.

In Column 24, Lines 54-60, in Claim 11, delete " 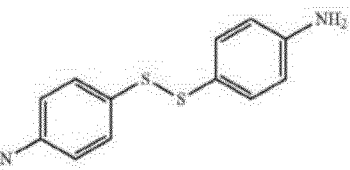 " and insert -- 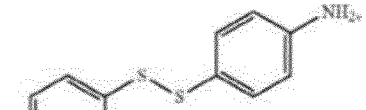 --, therefor.

Signed and Sealed this  
Twenty-third Day of October, 2018

Andrei Iancu  
*Director of the United States Patent and Trademark Office*